United States Patent [19]

Ito et al.

[11] Patent Number: 5,534,273
[45] Date of Patent: Jul. 9, 1996

[54] METHOD FOR MANUFACTURING PACKED WET-TYPE INSTANT NOODLES

[75] Inventors: Youichi Ito, Sapporo; Akihiro Hanaoka, Chiba; Kenichi Tezuka, Sapporo, all of Japan

[73] Assignee: Toyo Suisan Kaisha, Ltd., Tokyo, Japan

[21] Appl. No.: 454,695

[22] Filed: May 31, 1995

[30] Foreign Application Priority Data

Jul. 15, 1994 [JP] Japan .................................. 6-163875

[51] Int. Cl.$^6$ .............................. A23L 1/16; A23L 1/162; A21D 2/00
[52] U.S. Cl. ........................... 426/18; 426/557; 426/106; 426/451
[58] Field of Search ............................ 426/18, 557, 106, 426/451

[56] References Cited

U.S. PATENT DOCUMENTS

| | | | |
|---|---|---|---|
| 3,482,993 | 12/1969 | Finucane | 426/451 |
| 4,230,735 | 10/1980 | Yoshida et al. | 426/557 |
| 4,540,590 | 9/1985 | Harada et al. | 426/324 |

FOREIGN PATENT DOCUMENTS

| | | |
|---|---|---|
| 54-40621 | 12/1979 | Japan . |
| 56-24496 | 6/1981 | Japan . |
| 5-91845 | 4/1993 | Japan . |
| 6-14733 | 1/1994 | Japan . |

*Primary Examiner*—Donald E. Czaja
*Assistant Examiner*—Choon P. Koh
*Attorney, Agent, or Firm*—John P. White

[57] ABSTRACT

A method for manufacturing packed wet-type instant noodles of a double-layered structure which is simple in structure as compared with a three-ply structure, excellent in smoothness, tenacity and softness, and have improved elasticity and firmness. This method comprises the steps of, forming a first noodle strip from a dough obtained by kneading in vacuum a first raw material containing an alkaline agent and raw powders consisting mainly of wheat flour and starch, forming a second noodle strip from a dough obtained by kneading a second raw material in a vacuum higher in degree than that employed in kneading the first raw material, the second raw material containing alginic acid or alginate, an alkaline agent and raw powders consisting mainly of wheat flour and 7.0% by weight or more of protein, forming a two-ply noodle strip by superposing the first noodle strip upon the second noodle strip and rolling the superposed strips, cutting the two-ply noodle strip thereby obtaining two-ply raw noodles, steaming the two-ply raw noodles, drying the two-ply raw noodles with a hot air, boiling and then cooling with water the dried two-ply raw noodles, treating the cooled two-ply raw noodles with an acid solution, packing the two-ply raw noodles in a bag, and thermally sterilizing the packed two-ply raw noodles.

25 Claims, 1 Drawing Sheet

FIGURE 5,534,273

METHOD FOR MANUFACTURING PACKED WET-TYPE INSTANT NOODLES

BACKGROUND OF THE INVENTION

1. Field of the Invention

This invention relates to a method for manufacturing packed wet-type instant noodles, and in particular to a method for manufacturing packed wet-type instant noodles of a double-layered structure.

2. Description of the Related Art

Packed wet-type instant noodles are known to have advantages that they can be preserved at the ordinary temperature, and they can be turned into an edible state by retrogressing them with hot water within a shorter period of time as compared with dry type instant noodles such as fried noodles and dried noodles. Conventionally, the packed wet-type instant noodles are manufactured by a process comprising the steps of mixing and kneading an alkaline agent and raw powders consisting mainly of wheat flour and starch thereby forming a dough; preparing a noodle strip from the dough; cutting the noodle strip into a plurality of noodles thereby obtaining raw noodles; boiling and steaming the raw noodles; treating the raw noodles with an acid solution after cooling the boiled raw noodles; packing the raw noodles in a bag made of heat-resistant resin film; and heat treating the packed raw noodles thereby thermally sterilizing the raw noodles. For example, this packed wet-type instant noodles are offered as a packed of instant cup noodles by putting the packed wet-type instant noodles together with a soup-containing bag and an ingredients-containing bag into a bowl made of for example expanded polystyrene. When the packed wet-type instant noodles are to be eaten, the instant noodles are taken out of the heat-resistant resin film bag and introduced into the bowl together with a soup in the soup-containing bag, and, after pouring a hot water into the bowl, the whole mixture is left to stand for as short as one minute or so until it can be turned into an edible state. By contrast, in the case of fried noodles, it can not be turned into an edible state unless the fried noodles are left to stand for about three minutes after adding hot water to the fried noodles.

However, most of the packed wet-type instant noodles are poor in firmness so that it is hardly possible to obtain such an eating feeling as obtainable in the wet-type ordinary noodles.

In order to overcome the above drawback of the packed wet-type instant noodles, there has been proposed a method for manufacturing a packed wet-type instant noodles wherein protein such as the white and gluten or a thickener such as Locust bean gum and Xanthan gum are added to raw powders consisting mainly of wheat flour or wheat flour and starch for providing the raw noodles with firmness or elasticity (Koshi). It is certainly possible to improve the firmness of the packed wet-type instant noodles by using such raw powders. However, even with such a method, the wet-type instant noodles to be obtained are still short of firmness and smoothness which are peculiar to the wet-type ordinary noodles.

On the other hand, there has also been developed a method of manufacturing wet-type instant noodles of two-ply or three-ply structure. For example, Jpn. Pat. Appln. KOKOKU Publication No. 56-24496 discloses a method for manufacturing seasoned noodles of two-ply structure, which comprises the steps of preparing a noodle strip by mixing and rolling ingredients containing wheat flour mixed with an organic acid-containing food as a main component; preparing another noodle strip by mixing and rolling ingredients containing as a main component wheat flour without accompanying an organic acid-containing food; superposing the first-mentioned noodle strip upon the latter noodle strip thereby forming a two-ply strip; further rolling the two-ply strip thereby sufficiently adhering both noodle strips to each other; cutting the two-ply strip into a plurality of noodles thereby obtaining seasoned noodles of two-ply structure. However, this method for manufacturing seasoned noodles of two-ply structure is merely intended to produce ordinary noodles which is not an instant type and also is not adapted to be preserved for a long period of time.

Jpn. Pat. Appln. KOKAI Publication No. 5-91845 discloses a method for manufacturing packed wet-type instant noodles having three-ply structure wherein the middle layer is made rather hard and outer layers are made smooth, thereby making the eating feeling thereof more similar to the wet-type ordinary noodles. However, since the wet-type instant noodles thus obtained are a three-ply structure, the number of steps is inevitably increased and the manufacturing steps become rather complicated.

SUMMARY OF THE INVENTION

The object of the present invention is to provide a method for manufacturing packed wet-type instant noodles, which are of a double-layered (two-ply) structure so that simple in structure as compared with a three-ply structure, excellent in smoothness, tenacity and softness, and have improved elasticity and firmness.

Namely, according to the present invention, there is provided a method for manufacturing packed wet-type instant noodles, which comprises the steps of;

forming a first noodle strip from a dough obtained by kneading in a vacuum a first raw material containing an alkaline agent and raw powders consisting mainly of wheat flour and starch;

forming a second noodle strip from a dough obtained by kneading a second raw material in a vacuum higher in degree than that employed in kneading the first raw material, the second raw material containing alginic acid or alginate, an alkaline agent and raw powders consisting mainly of wheat flour and 7.0% by weight or more of protein;

forming a two-ply noodle strip by superposing the first and second noodle strips upon one another, and by rolling the superposed strips;

cutting the two-ply noodle strip into a plurality of noodles thereby obtaining two-ply raw noodles;

steaming the two-ply raw noodles;

drying the two-ply raw noodles with a hot air;

boiling and cooling with water the two-ply raw noodles thus dried;

treating the cooled two-ply raw noodles with an acid solution;

packing the two-ply raw noodles in a bag; and heat treating the packed two-ply raw noodles thereby thermally sterilizing the two-ply raw noodles.

Further, according to the present invention, there is also provided a method for manufacturing packed wet-type instant noodles, which comprises the steps of;

forming a first noodle strip from a dough obtained by kneading in a vacuum a first raw material containing an alkaline agent and raw powders consisting mainly of wheat flour and starch;

forming a second noodle strip from a dough obtained by kneading a second raw material in a vacuum higher in degree than that employed in kneading the first raw material, the second raw material containing alginic acid or alginate, trans-glutaminase, casein-decomposition material, an alkaline agent, and raw powders consisting mainly of wheat flour and 7.0% by weight or more of protein;

forming a two-ply noodle strip by superposing the first and second noodle strips upon one another, and by rolling the superposed strips;

cutting the two-ply noodle strip into a plurality of noodles thereby obtaining two-ply raw noodles;

steaming the two-ply raw noodles;

boiling and cooling with water the two-ply raw noodles thus dried;

treating the cooled two-ply raw noodles with an acid solution;

packing the two-ply raw noodles in a bag; and heat treating the packed two-ply raw noodles thereby thermally sterilizing the two-ply raw noodles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

The Figure accompanying the present specification is a perspective view showing an apparatus for manufacturing a two-ply noodle strip according to the manufacturing method of the present invention.

DETAILED DESCRIPTION OF THE PREFERRED EMBODIMENTS

Figure 1:
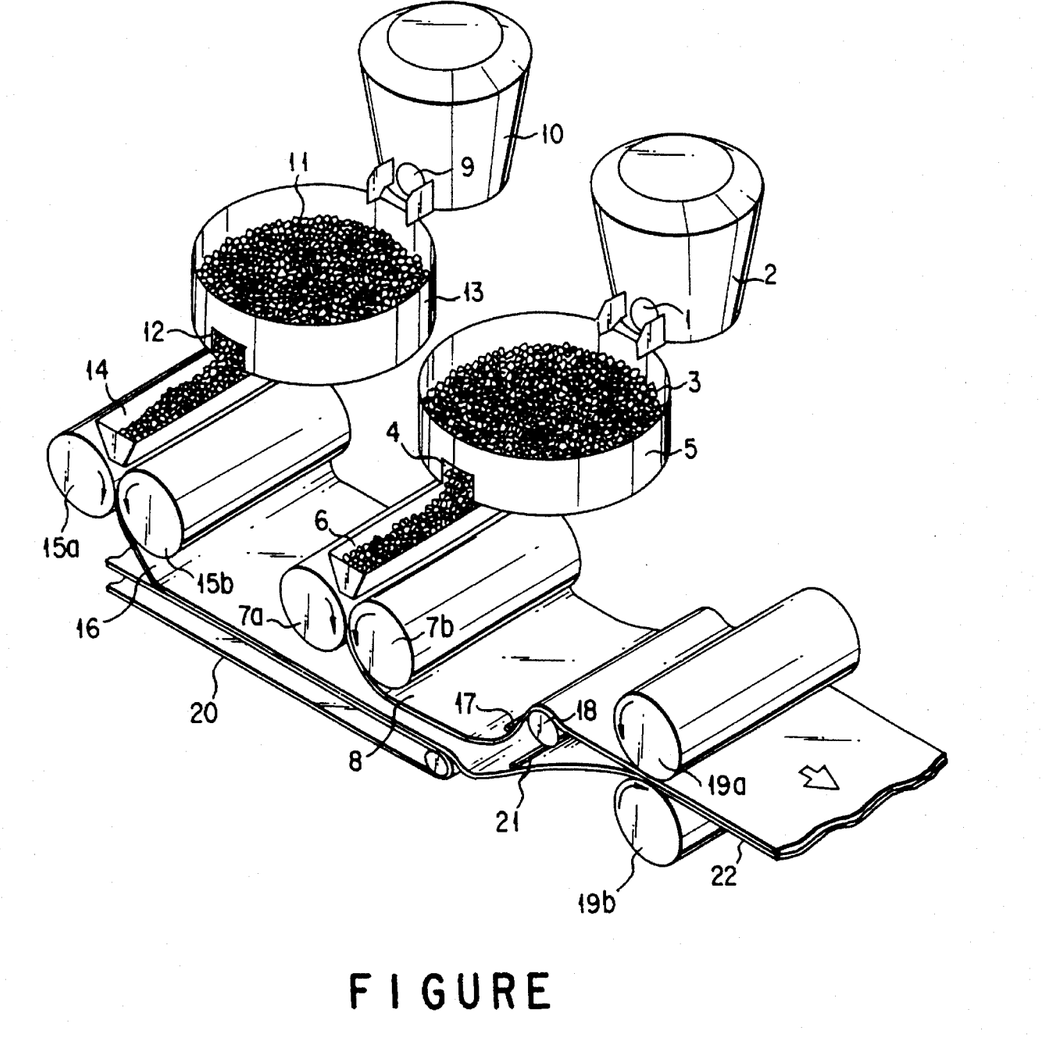

The method for manufacturing a packed wet-type instant noodles of a double-layered structure of this invention will be explained with reference to the drawing.

As shown in the figure, a first raw material containing an alkaline agent and raw powders consisting mainly of wheat flour and starch is charged into a first mixer 2 provided at the lower side wall with a discharge port 1 which is adapted to be closed by a door not shown. The first raw material is then mixed and kneaded in this first mixer 2 in a vacuum thereby to form a first dough 3. The first dough 3 thus formed is then transferred via the discharge port 1 to a cylindrical first feeder 5 provided at the bottom thereof with rotating blades (not shown) and at the lower side wall thereof with a outlet port 4, which is adapted to be closed by a shutter (not shown) attached in such a manner as to be moved up and down. The first dough 3 in the feeder 5 is then discharged into a first hopper 6 having an elongated shape from the outlet port 4 by the rotation of the rotating blades, and at the same time a scraper (not shown) is actuated so as to fill up the hopper 6 with the first dough 3. A pair of rolls 7a and 7b are disposed directly below the hopper 6, each being adapted to be rotated in a direction opposite to each other. The first dough 3 is fed from the hopper 6 to a space between the pair of the rolls 7a and 7b to be rolled by the pair of the rolls 7a and 7b thereby obtaining a first noodle strip 8.

Further, as shown in the figure, a second raw material containing alginic acid or alginate, an alkaline agent, and raw powders consisting mainly of wheat flour and 7.0% by weight or more of protein is charged into a second mixer 10 provided at the lower side wall with a discharge port 9 adapted to be closed by a door not shown. The second raw material is then mixed and kneaded in this second mixer 10 in a vacuum atmosphere which is higher in degree than that employed in kneading the first raw material thereby to form a second dough 11. The second dough 11 thus formed is then transferred via the discharge port 9 to a cylindrical second feeder 13 provided at the bottom thereof with rotating blades (not shown) and at the lower side wall thereof with a outlet port 12, which is adapted to be closed by a shutter (not shown) attached in such a manner as to be moved up and down. The second dough 11 in the second feeder 13 is then discharged into a second hopper 14 having an elongated shape from the outlet port 12 by the rotation of the rotating blades, and at the same time a scraper (not shown) is actuated so as to fill up the hopper 14 with the second dough 11. A pair of rolls 15a and 15b are disposed directly below the hopper 14, each being adapted to be rotated in a direction opposite to each other. The second dough 11 is fed from the hopper 14 to a space between the pair of the rolls 15a and 15b to be rolled by the pair of the rolls 15a and 15b thereby obtaining a second noodle strip 16.

The first noodle strip 8 is then fed to a space between a pair of composite rolls 19a and 19b while being guided by a guide bar 17 and a guide roll 18, and at the same time the second noodle strip 16 is fed to a space between a pair of composite rolls 19a and 19b while being guided by an endless belt 20 and a guide bar 21. As a result, these first strip 8 and second strip 16 are rolled as they are passed through a space between the composite rolls 19a and 19b while being superposed to each other thereby forming a two-ply noodle strip 22.

Furthermore, the two-ply noodle strip 22 is passed through a multi-roll comprising a sequence of plural pairs of rolls, and then passed through a pair of cutter rolls thereby being cut down into a plurality of noodles thereby obtaining raw noodles of a two-ply structure consisting of a first layer formed from the first noodle strip and a second layer formed from the second noodle strip and superposed upon the first layer. These two-ply raw noodles are subsequently steamed and then dried with hot air.

The two-ply raw noodles thus dried are further boiled and water-cooled. Subsequently, the two-ply raw noodles are treated with an acid solution, and then packed in a bag made of a heat-resistant resin film such as polypropylene film. Finally, the packed two-ply raw noodles are subjected to a heat treatment for sterilizing the two-ply raw noodles thereby obtaining packed wet-type instant noodles having a double-layered structure.

Examples of starch to be incorporated in the first raw material in the manufacture of the first noodle strip are Waxy starch, Tapioca starch and potato starch. These starches to be employed in the first raw material are effective in giving smoothness, tenacity and softness to the first layer consisting of the first raw material of the packed wet-type instant noodles of a double-layered structure. The amount of the starch may be suitably selected depending on the smoothness, tenacity and softness desired for the first layer of the packed wet-type instant noodles. For example, the amount of the starch to be incorporated in the first raw material may be in the range of 15 to 50% by weight.

Examples of alkaline agent to be incorporated into the first raw material are sodium carbonate, potassium carbonate, sodium bicarbonate and sodium phosphate.

In addition to the raw powders and alkaline agent, table salt, colorant and the like may be incorporated into the first raw material.

The wheat flour to be incorporated into the second raw material for manufacturing the second noodle strip may be the same as, or different from that used for the first raw material.

Gluten (protein extracted from wheat flour) may be incorporated as a raw powder into the second raw material. It is also possible to incorporate other kinds of protein derived from other raw materials in place of gluten.

The reason of limiting the amount of protein to be incorporated into the raw powders of the second raw material is as follows. If the amount of the protein is less than 7% by weight, it becomes very difficult to impart desired elasticity and firmness to the second layer consisting of the second raw material constituting packed wet-type instant noodles having a two-ply structure through the interaction between protein and alginic acid or alginate. A preferred content of protein in the second raw powders is in the range of 8 to 12% by weight.

Examples of alginate to be incorporated into the second raw material are sodium alginate and potassium alginate. Alginic acid or alginate is employed for compensating for the loss in elasticity and firmness of raw noodles imparted through the addition of protein that would be brought about by the steps of the acid solution treatment or heat treatment of the raw noodles. Preferable content of alginic acid or alginate to be added to the second raw material is 0.2 to 0.6% by weight based on the raw powders.

In addition to the raw powders, alginic acid or alginate and alkaline agent, table salt, colorant and the like may be incorporated into the second raw material. It is also possible as required to incorporate the egg white into the second raw material.

The kneading of the first and second raw materials during the steps of manufacturing the first and second noodle strip are carried out under a vacuum atmosphere in the first and second mixers respectively in order to densifying the texture of noodles formed by wheat flour which is contained in the raw powders. When the two-ply raw noodles obtained from the two-ply noodle strip are boiled, the first layer consisting of the first raw material is more likely to be a α-transformed, but the second layer consisting of the second raw material is not likely to be a α-transformed. Accordingly, the second layer of this noodles gives an eating feeling of fragility, or poor consistency. On the other hand, if the noodles are treated for long period of time in an attempt to fully a α-transform the second layer, the first layer consisting of the first raw material would be excessively boiled thus giving an eating feeling of stickiness. In view of these phenomena, the degree of vacuum in the kneading step of the second raw material is made higher than that in the kneading step of the first raw material so as to sufficiently degas the second raw material, thereby improving the heat conduction of the second layer consisting of the second raw material, thus making it possible to make uniform the α-transformation state of the both first and second layers. Specifically, it is preferred that the first raw material is kneaded at a vacuum of −450 to −350 mmHg, and the second raw material is kneaded at a vacuum of −760 to −650 mmHg.

Since the consistency of the texture of the first noodle strip containing starch is comparatively poor, it is preferred that the first noodle strip 8 and the second noodle strip 16 are fed between a pair of composite rolls 19a and 19b in the step of manufacturing the two-ply noodle strip 22 in such a manner that the first noodle strip 8 is superposed upon the second noodle strip 16, i.e. the first noodle strip 8 being disposed as an upper layer and the second noodle strip 16 as a lower layer as shown in the Figure.

The steaming step can be carried out by exposing the raw noodles to steam atmosphere. This steaming step may also be conducted by exposing the raw noodles to spray of hot water in the way of passing the raw noodles through the steam atmosphere.

The step of drying the raw noodles with hot air may be conducted by passing the raw noodles through a hot air drying oven which is kept at a temperature of 70° to 100° C. and an absolute humidity of 140 to 180 g/m$^3$. It is preferred that the hot air drying should be carried out while introducing steam into the hot air drying oven.

The boiling step should preferably be carried out by partitioning the raw noodles into portions each corresponding to one meal, and immersing the partitioned portions of the raw noodles in a boiling water bath after putting the partitioned portions into a vessel such as a bucket. The operation of boiling should preferably be conducted in such a degree that the water content of the raw noodles becomes 57 to 62%. The reason for limiting the water content of the raw noodles is as follows. Namely, if the water content of the raw noodles is less than 57%, the raw noodles are underdone so that the raw noodles may become powdery and poor in consistency. On the other hand, if the water content of the raw noodles is more than 62%, the raw noodles may be elongated due to the boiling thereof and become poor in elasticity.

The step of acid-treatment may be carried out by either immersing the raw noodles which have been water-cooled in an aqueous solution of organic acid such as an aqueous solution of citric acid or an aqueous solution of lactic acid, or spraying the raw noodles with an aqueous solution of organic acid as mentioned above. This acid-treatment should preferably be carried out such that the pH of the raw noodles after the acid-treatment becomes in the range of 4.0 to 5.0. If the pH of the raw noodles after the acid-treatment is less than 4.0, the acidity of packed wet-type instant noodles may be strongly felt as they are eaten and at the same time the consistency of the noodles becomes so poor that they may be easily broken down. On the other hand, if the pH of the raw noodles after the acid-treatment is more than 5.0, the sterilizing effect of the acid is lowered so that the heat treatment at a high temperature may be required, thus giving rise to the deterioration of packed wet-type instant noodles and the lowering of eating feeling.

The step of heat treatment may preferably be carried out, though dependent on the treatment time, at a temperature of 90° to 110° C.

The packed wet-type instant noodles according to the present invention can be served as noodles by mixing thereto a soup, or as a chow main by mixing thereto a sauce. For example, the packed wet-type instant noodles can be offered as a package of instant cup noodles by putting the packed wet-type instant noodles together with a soup-containing bag and an ingredients-containing bag into a bowl made of an insulating material such as expanded polystyrene.

As explained above, the present invention provides a method for manufacturing packed wet-type instant noodles, comprising the steps of; forming a first noodle strip and a second noodle strip; superposing these first and second noodle strips upon one another; forming two-ply raw noodles consisting of a first layer formed from a first noodle strip and a second layer formed from a second noodle strip stacked on the first layer by cutting the two-ply noodle strip; steaming and boiling the two-ply raw noodles; subjecting the two-ply raw noodles to an acid treatment; packing the two-ply raw noodles; and thermally sterilizing the two-ply raw noodles; which is characterized in that;

a composition containing an alkaline agent and raw powders consisting mainly of wheat flour and starch is employed as a first raw material of the first noodle strip, and a composition containing alginic acid or alginate, an alkaline agent and raw powders consisting mainly of wheat flour and 7.0% by weight or more of protein is employed as a second raw material of the second noodle strip;

the step of kneading the first and second raw materials is performed in a vacuum; and the raw noodles are subjected to a hot air drying before the step of boiling the raw noodles.

with this process, it has been made possible to obtain packed wet-type instant noodles of a double-layered structure and excellent features that can never be obtained with packed wet-type instant noodles of a single layered structure, such as suitable tenacity and softness, and improved firmness, and being excellent in long-term preservation at the ordinary temperature. Further, this packed wet-type instant noodles of a two-ply structure can be easily manufactured without undergoing a troublesome steps as required in the manufacture of the conventional packed wet-type instant noodles of a three-ply structure.

The main issue in the manufacture of the packed wet-type instant noodles of a single layer structure is a difficulty of simultaneously imparting (a) smoothness, tenacity and softness; and (b) elasticity and firmness to the raw noodles, since the characteristic (a) conflicts with the characteristic (b).

In view of solving the above problem, the following countermeasures were taken. Namely, a first noodle strip essentially having the characteristic (a) was obtained by kneading and rolling in the conventional manner a first raw material containing an alkaline agent and raw powders consisting mainly of wheat flour and starch, namely a first raw material having a composition essentially containing starch which is effective in modifying the characteristic of noodles, such as softness. Further, a second noodle strip essentially having the characteristic (b) was obtained by kneading and rolling in the conventional manner a second raw material containing alginic acid or alginate, an alkaline agent and raw powders consisting mainly of wheat flour and 7.0% by weight or more of protein, namely a second raw material having a composition essentially containing a prescribed amount of protein which is effective in contributing the modification of the characteristics of noodle, such as elasticity, and alginic acid or alginate which is effective in making up for the loss in elasticity that would be caused during the steps of acid treatment and heat-treatment. These first and second noodle strips were stacked one upon another, and rolled thereby forming a two-ply noodle strip, then cut down the two-ply noodle strip to form two-ply raw noodles. The resultant two-ply raw noodles were steamed, boiled and subjected to an acid treatment. Thereafter, the two-ply raw noodles were packed and heat-treated thereby obtaining thermally sterilized two-ply raw noodles. The packed wet-type instant noodles of a two-ply structure thus obtained was expected to be superior in smoothness, tenacity, softness, elasticity and firmness as compared with the wet-type instant noodles of single layered structure.

However, when this wet-type instant noodles of a two-ply structure were actually tasted by the inventors, it was found that an eating feeling expected of the characteristics (a) and (b) was not realized as a matter of fact. The cause of this poor eating feeling was found to be attributed to the problems peculiar to the two-ply structure as explained below.

(1) When the two-ply raw noodles are steamed after cutting the superposed and rolled structure of the first and second noodle strips having a different composition from each other, a difference in $\alpha$-transformation state is caused between the first layer consisting of the first noodle strip and the second layer consisting of the second noodle strip due to the difference in composition between the first and second noodle strips. Namely, when the conditions of steaming is set to conform with the characteristic of the first layer consisting of the first raw material comprising the raw powders containing wheat flour and starch as main components in this two-ply raw noodles, the second layer consisting of the second raw material comprising raw powders containing wheat flour as a main component becomes short of steaming, thereby giving an eating feeling of poor consistency (or fragile feeling). On the other hand, when the conditions of steaming is set to conform with the characteristic of the second layer consisting of the second raw material comprising the raw powders containing wheat flour as main component in this wet-type instant noodles of a two-ply structure, the first layer containing starch as an essential component is steamed excessively, thereby giving an eating feeling of stickiness.

(2) alginic acid or alginate is eluted out of the second layer consisting of the second noodle strip during the steaming step of the two-ply raw noodles. Namely, although alginic acid is substantially insoluble to water, when the alginic acid is reacted with sodium, potassium or ammonium, the resultant alginates become soluble to water, thereby producing a viscous aqueous solution. However, when another acid is added to this viscous aqueous solution, alginic acid is again precipitated from this aqueous solution. Because of this characteristic of alginic acid, when the raw noodles comprising the second layer containing alginic acid or alginate are boiled after being steamed, the alginic acid or alginate existing at least on the surface of the second layer is eluted out together with farinaceous substance into the boiling water. Basically, alginic acid or alginate are incorporated into the second layer for the purpose of making up for the loss in elasticity and firmness, which have been initially imparted by the addition of protein to the raw powders of the second layer, during the acid treatment step and heat-treatment step of raw noodles. However, due to the elution of the alginic acid or alginate as mentioned above, it is hardly possible to fully make up for the loss in elasticity and firmness based on the addition of protein.

In view of this fact, the inventors have tried to carry out the kneading of the first and second raw materials in such a manner that the kneading of the second raw material comprising raw powder containing wheat flour as a main component was carried out at a vacuum which is higher than that in the kneading step of the first raw material comprising raw powder containing wheat flour and starch as a main component so as to fully degas the second raw material. When the first and second noodle strips obtained by using the first and second raw materials are stacked upon on another, and then steamed after being rolled and cut down, the conduction of heat through the second layer consisting of the second raw material becomes excellent so that it has become possible to make uniform the α-transformation states of the first layer and the second layer. Namely, with the adjustment of vacuum at the step of kneading the first and second raw materials, it has now become possible to eliminate the eating feeling of poor consistency which would be caused by the insufficient steaming of the second layer consisting of the second raw material comprising raw powders containing wheat flour as a main component at the occasion of steaming the two-ply raw noodles, and at the same time to avoid the stickiness of raw noodles due to the excessive boiling of the first layer consisting of the first raw material comprising raw powders containing wheat flour and starch as main components.

Accordingly, it has become possible to effectively impart the characteristic (a) (smoothness, tenacity and softness) inherent to the first layer, and also the characteristic (b) (elasticity, and firmness) inherent to the second layer to packed wet-type instant noodles of a two-ply structure.

By the way, since the consistency of the texture of the first noodle strip containing starch is comparatively poor, the first noodle strip and the second noodle strip should be fed between a pair of composite rolls in the step of manufacturing the two-ply noodle strip in such a manner that the first noodle strip is superposed upon the second noodle strip, i.e. the first noodle strip being disposed as an upper layer and the second noodle strip as a lower layer, thereby avoiding the first noodle strip from being torn to pieces at the step of superposing and rolling the first and second noodle strips.

It has been found that the elution of alginic acid or alginate from the second layer of the raw noodles during the boiling step can be effectively prevented by subjecting the steamed two-ply raw noodles to a hot air drying before the raw noodles are subjected to the boiling step.

Namely, when the raw noodles of two-ply structure are dried with hot air, the texture of a α-transformed starch on the surface of the raw noodles are modified into a dense structure so that the elution of starch on the surface of the raw noodles can be controlled to minimum, and at the same time the elution of alginic acid or alginate from the second layer of the two-ply raw noodles can be effectively prevented. As a result, a sufficient amount of alginic acid or alginate, which is almost equal to the initial volume thereof contained in the second raw material, can be kept remained in the second layer of the two-ply raw noodles even after the boiling step.

with this sufficient amount of alginic acid or alginate remaining in the second layer, it becomes possible to make up for the loss of elasticity and firmness, which have been initially imparted by the addition of protein to the second layer of the two-ply raw noodles, during the steps of acid treatment step and heat-treatment step after the boiling step. As a result, it becomes possible to impart excellent elasticity and firmness to the second layer of the packed wet-type instant noodles.

Further, as an incidental effect of becoming dense in surface texture of the raw noodles by the hot air drying, an excessive penetration of hot water into the raw noodles during the boiling step can be prevented by 10 this dense surface texture. Accordingly, heat can be transmitted into the central portion of the raw noodle without causing the water content in the raw noodles to be excessively increased. As a result, the raw noodles can be sufficiently boiled thereby making it possible to obtain raw noodles which are free from powdery feeling without excessively increasing the water content of the raw noodles. At the same time, the crumbling the surface of the raw noodles during the boiling step can be controlled or inhibited by this dense surface texture. As a result, it is possible to make smooth the surface of the second layer not containing substantial amount of starch.

Especially, it is also possible to make more dense the texture of a α-transformed starch on the surface of the raw noodles without causing the surface of the raw noodles to become excessively dried by carrying out the step of hot air drying while introducing steam into the drying oven.

Since the raw noodles are acid-treated after the boiling step and packed, and then heat-treated, the spoiling of the packed wet-type instant noodles can be effectively prevented and the packed wet-type instant noodles can be preserved for a long period of time at the ordinary temperature.

According to the process of this invention, it has become possible to obtain a packed wet-type instant noodles having a double-layered structure and excellent features that would never be obtained with wet-type instant noodles of single layered structure, i.e. suitable tenacity and softness, and improved firmness, and being excellent in long-term preservation at the ordinary temperature. Further, this packed wet-type instant noodles of a two-ply structure can be easily manufactured without undergoing a troublesome steps as required in the manufacture of the conventional three-ply structure.

Another manufacturing method of packed wet-type instant noodles according to this invention will be explained as follows.

At first, a first noodle strip is formed by kneading in a vacuum a first raw material containing an alkaline agent and raw powders consisting mainly of wheat flour and starch to obtain a first dough, and then rolling the first dough by using an apparatus shown in the Figure. On the other hand, a second noodle strip is formed by kneading a second raw material containing alginic acid or alginate, trans-glutaminase, casein-decomposition material, an alkaline agent, and raw powders consisting mainly of wheat flour and 7.0% by weight or more of protein in a vacuum higher in degree than that employed in kneading the first raw material to obtain a second dough, and then rolling the second dough by using an apparatus shown in the Figure.

Then, the first noodle strip is superposed upon the second noodle strip, and rolled thereby obtaining a two-ply noodle strip. This two-ply noodle strip is then further rolled by using a multi-stage roll, and cut into a plurality of noodles by being passed through a space between a pair of cutter rolls, thereby obtaining two-ply raw noodles consisting of a first layer made from the first noodle strip and a second layer made from the second noodle strip. The resultant two-ply raw noodles are then steamed.

The two-ply raw noodles thus steamed are further boiled and water-cooled. Subsequently, the two-ply raw noodles are treated with an acid solution, and then packed in a bag made of a heat-resistant resin film such as polypropylene film. Finally, the packed two-ply raw noodles is subjected to a heat treatment the two-ply raw noodles thereby obtaining packed wet-type instant noodles of a double-layered structure.

The content of the starch to be incorporated in the first raw material may preferably be in the range of 15 to 50% by weight as explained previously.

Examples of alkaline agent to be incorporated into the first raw powder are sodium carbonate, potassium carbonate, sodium bicarbonate and sodium phosphate.

In addition to the raw powders and alkaline agent, table salt, colorant and the like may be incorporated into the first raw material.

Gluten (protein extracted from wheat flour) may be incorporated into the raw powders of the second raw material to be employed in the manufacture of the second noodle strip. It is also possible to incorporate other kinds of protein derived from other raw materials in place of gluten.

The reason of limiting the amount of protein to be incorporated into the raw powders of the second raw material is as follows. If the amount of the protein is less than 7% by weight, it becomes very difficult to impart desired elasticity and firmness to the second layer consisting of the second raw material constituting packed wet-type instant noodles of a two-ply structure through the interaction between protein and alginic acid or alginate. A preferred amount of protein in the second raw powder is in the range of 8 to 12% by weight.

Examples of alginate to be incorporated into the second raw material are sodium alginate and potassium alginate. Alginic acid or alginate is employed for compensating for the loss in elasticity and firmness of raw noodles imparted through the addition of protein that would be brought about by being subjected to the steps of the acid solution treatment or heat-treatment of the raw noodles. Preferable amount of alginic acid or alginate to be added to the second raw material is 0.2 to 0.6% by weight based on the raw powder.

The trans-glutaminase contained in the second raw material is an enzyme which catalyzes the acyl-transformation reaction between a $\alpha$-carboxideamide group of glutamic residual group in polypeptide chain and primary amine of various kinds. Namely, since the trans-glutaminase is an enzyme which promotes the crosslinking of polypeptide chain, it promotes the crosslinking reaction between the glutens, a kind of protein in the raw powder, thereby densifying and strengthening the network structure of gluten. The trans-glutaminase may preferably be added to the raw powder at the ratio of 10 to 200 units per 100 g of the raw powder. If the ratio of the trans-glutaminase is lower than the lower limit of 10 units, the effects of the trans-glutaminase, such as the improvement of excellent tough feeling of the pack wet-type instant noodles having a double-layered structure can hardly be obtained. On the other hand, if the ratio of the trans-glutaminase is more than the upper limit of 200 units, it gives rise to an eating feeling of poor consistency. Preferred mixing ratio of the trans-glutaminase is in the range of 20 to 150 units per 100 g of the raw powder.

The purpose of adding the casein-decomposition material to the second raw material is to control the crosslinking reaction between glutens, i.e. protein in the raw powder, which can be effected by the action of the trans-glutaminase. Preferred example of casein-decomposition material is one which can be obtained by decomposing the end portion of casein by the protein decomposition enzyme. Example of such casein-decomposition material is Peptide C-700 (trademark), which is available from Morinaga Nyugyo Co. Ltd.

Casein-decomposition material may preferably be added to the raw powder at the ratio of 0.3 to 2.0 g per 100 units of the trans-glutaminase. If the mixing ratio of casein-decomposition material is less than lower limit of 0.3 g, it may cause not only the hardening of packed wet-type instant noodles so as to be easily broken, but also the decrease in elasticity of the packed wet-type instant noodles to be obtained. On the other hand, if the mixing ratio of casein-decomposition material is more than upper limit of 2.0 g, it may cause an excessive decrease in hardness of packed wet-type instant noodles so that it becomes too soft. Preferred mixing ratio of the casein-decomposition material is in the range of 0.5 to 1.5 g per 100 units of the trans-glutaminase.

Table salt, colorant and the like may be incorporated into the second raw powder in addition to the raw powder, alginic acid or alginate, the trans-glutaminase, casein-decomposition material and alkaline agent. It is also possible as required to incorporate the egg white into the second raw powders.

The manufacture of the first and second noodle strips should be carried out, as explained with reference to the previous manufacturing process of the packed wet-type instant noodles, in such a manner that the degree of vacuum in the kneading step of the second raw powder is made higher than that in the kneading step of the first raw material so as to sufficiently degas the second raw material, thereby improving the heat conduction of the second layer consisting of the second raw material, thus making it possible to make uniform the $\alpha$-transformation state of the both first and second layers. Specifically, it is preferred that the first raw material is kneaded at a vacuum of −450 to −350 mmHg, and the second raw material is kneaded at a vacuum of −760 to −650 mmHg.

Since the consistency of the texture of the first noodle strip containing starch is comparatively poor, it is preferred that the first noodle strip and the second noodle strip are fed between a pair of composite rolls and in the step of manufacturing the two-ply noodle strip in such a manner that the first noodle strip is superposed upon the second noodle strip, i.e. the first noodle strip being disposed as an upper layer and the second noodle strip as a lower layer.

The steaming step can be carried out by exposing the raw noodles to steam atmosphere. This steaming step may also be conducted by exposing the raw noodles to spray of hot water in the way of passing the raw noodles through the steam atmosphere.

The boiling step should preferably be carried out by partitioning the raw noodles into portions each corresponding to one meal, and immersing the partitioned portions of the noodles in a boiling water bath after putting the partitioned portions into a vessel such as a bucket. The operation of boiling should preferably be conducted in such a degree that the water content of the raw noodles becomes 57 to 62%. The reason for limiting the water content of the noodles is as follows. Namely, if the water content of the raw noodles is less than 57%, the raw noodles become underdone so that the raw noodles may become powdery and poor in consistency. On the other hand, if the water content of the raw noodles is more than 62%, the raw noodles may be elongated due to the boiling and become poor in elasticity.

The step of acid-treatment may be carried out by either immersing the raw noodles which have been water-cooled in an aqueous solution of organic acid such as an aqueous solution of citric acid or an aqueous solution of lactic acid, or spraying the raw noodles with an aqueous solution of organic acid as mentioned above. This acid-treatment should preferably be carried out, as explained with reference to the previous manufacturing process of the packed wet-type instant noodles, such that the pH of the noodles after the acid-treatment becomes in the range of 4.0 to 5.0.

The step of heat-treatment may preferably be carried out, though dependent on the treatment time, at a temperature of 90° to 110° C.

In the method for manufacturing packed wet-type instant noodles of a two-ply structure according to this invention, the raw noodles may be subjected to a hot air drying treatment after the steaming step and in advance to the boiling step. This drying step with hot air may be conducted by passing the raw noodles through a hot air drying oven which is kept at a temperature of 70° to 100° C. and an absolute humidity of 140 to 180 g/m³. It is preferred that the hot air drying should be carried out while introducing steam into the hot air drying oven.

As explained above, the present invention provides a method for manufacturing packed wet-type instant noodles having a double-layered structure, comprising the steps of; forming a first noodle strip and a second noodle strip; superposing these first and second noodle strips upon one another; forming two-ply raw noodles consisting of a first layer formed from a first noodle strip and a second layer formed from a second noodle strip stacked on the first layer by cutting the two-ply noodle strip; steaming and boiling the two-ply raw noodles; subjecting the two-ply raw noodles to an acid treatment; packing the two-ply raw noodles; and heat-treating the two-ply raw noodles; which is characterized in that;

a composition containing an alkaline agent and raw powders consisting mainly of wheat flour and starch is employed as a first raw material of the first noodle strip, and a composition containing alginic acid or alginate, trans-glutaminase, casein-decomposition material and an alkaline agent and raw powders consisting mainly of wheat flour and 7.0% by weight or more of protein is employed as a second raw material of the second noodle strip; and the step kneading the first and second raw materials is performed in a vacuum.

With this process, it has been made possible to obtain packed wet-type instant noodles of a double-layered structure and excellent features that can never be obtained with packed wet-type instant noodles of a single layered structure, such as suitable tenacity and softness, and improved firmness, and being excellent in long-term preservation at the ordinary temperature.

As explained above, it has been made possible to attain the uniformity in α-transformation state of the first layer and the second layer of the raw noodles having a two-ply structure by conducting the kneading of the first and second raw materials in such a manner that the kneading of the second raw material comprising raw powder containing wheat flour as a main component was carried out at a vacuum which is higher than that in the kneading step of the first raw material comprising raw powder containing wheat flour and starch as a main component so as to fully degas the second raw material.

Further, it has become possible to inhibit the elution of alginic acid or alginate from the second layer of the raw noodles during the step of boiling the raw noodles without subjecting the raw noodles to a hot air drying step in advance to the boiling step as is the case of the previous method for manufacturing packed wet-type instant noodles by incorporating trans-glutaminase, casein-decomposition material into the second raw material constituting the second layer of the two-ply raw noodles. This inhibiting effect is considered to be attributed to the interaction between alginic acid or alginate and any of wheat flour, trans-glutaminase and casein-decomposition material as explained below.

Namely, when the second raw material is prepared by adding trans-glutaminase and casein-decomposition material together with alginic acid or alginate to the raw powder containing wheat flour having 7% or more of protein as a main component, and is then kneaded, the crosslinking reaction between the glutens, i.e. a predominant protein in wheat flour, is promoted, thereby densifying and strengthening the network structure of gluten, and at the same time the casein-decomposition material is bonded between "gluten-gluten" linkages so as to form a new network structure of "gluten-casein-decomposition material-gluten" linkage. Therefore, a dough having quite different physical properties from the one not containing any of trans-glutaminase and casein-decomposition material can be obtained. Further, this dough has a tendency to persistently incorporate therein alginic acid or alginate. When two-ply noodles are manufactured by using this dough by a sequence of steps; i.e. rolling this dough to form a second noodle strip; superposing the second noodle strip upon the above mentioned first noodle strip; rolling the resultant two-ply strip; cutting the two-ply strip thereby obtaining two-ply raw noodles; and steaming and boiling the two-ply raw noodles, it is possible to keep a sufficient amount of alginic acid or alginate in the second layer of the two-ply raw noodles even after the boiling treatment. The sufficient amount is almost equal to the amount which has been initially included in the second layer of the raw noodles.

with this sufficient amount of alginic acid or alginate remaining in the second layer, it becomes possible to make up for the loss of elasticity and firmness, which have been initially imparted by the addition of protein to the second layer of the two-ply raw noodles, during the steps of acid treatment and thermal sterilization after the boiling step. As a result, it becomes possible to impart excellent elasticity and firmness to the second layer of the noodles.

Furthermore, with the formation of this new network structure of "gluten-casein-decomposition material-gluten" linkage in the second layer of the raw noodles, it has become possible to impart an excellent elasticity and smoothness to the second layer of the packed wet-type instant noodles.

Further, according to another method of this invention, the two-ply raw noodles are dried with hot air after the step of steaming and before the step of boiling so as to cause the texture of a α-transformed starch on the surface of the raw noodles to be modified into a dense structure so that the elution of farinaceous substance on the surface of the raw noodles can be controlled to minimum in the boiling step, and at the same time the elution of alginic acid or alginate from the second layer of the raw noodles can be effectively prevented. As a result, it becomes possible to impart excellent elasticity, firmness and smooth surface to the second layer of the packed wet-type instant noodles.

Accordingly, it has become possible to obtain packed wet-type instant noodles having a double-layeres structure and excellent features, which are balanced in smoothness, tenacity and softness as well as in improved firmness, and being excellent in long-term preservation at the ordinary temperature.

Preferred examples of this invention will be further explained with reference to the Figure as follows.

EXAMPLE 1

A first raw material consisting of the following composition was kneaded in the first mixer 2 shown in the Figure at a vacuum of −400 mmHg for 15 minutes, and then the resultant dough 3 was fed via a first feeder 5 and a first hopper 6 between a pair of rolls 7a and 7b to be rolled by the pair of the rolls 7a and 7b thereby obtaining a first noodle strip 8 having a thickness of 5.5 mm.

| (The composition of the first raw material) | |
|---|---|
| Semistrong flour | 3 kg |
| Tapioca starch | 2 kg |
| Table salt | 50 g |
| Kansui (aqueous solution of natural soda) | 10 g |
| Gardenia yellow dye | 3 g |
| Water | 1.85 kg |

A second raw material consisting of the following composition was kneaded in the second mixer 10 shown in the Figure at a vacuum of −700 mmHg for 15 minutes, and then the resultant dough 11 was fed via a second feeder 13 and a second hopper 14 between a pair of rolls 15a and 15b to be rolled by the pair of the rolls 15a and 15b thereby obtaining a second noodle strip 16 having a thickness of 5.5 mm.

| (The composition of the second raw material) | |
|---|---|
| Medium flour (containing crude protein of 8% by weight) | 5 kg |
| Sodium alginate | 20 g |
| Table salt | 50 g |
| Kansui (aqueous solution of natural soda) | 10 g |
| Gardenia yellow dye | 3 g |
| Water | 1.85 kg |

Subsequently, as shown in the figure, the first noodle strip 8 was then fed to a space between a pair of composite rolls 19a and 19b while being guided by a guide bar 17 and a guide roll 18, and at the same time the second noodle strip 16 was fed to a space between a pair of composite rolls 19a and 19b while being guided by an endless belt 20 and a guide bar 21. Namely, the first noodle strip 8 and the second noodle strip 16 were fed between a pair of composite rolls 19a and 19b in such a manner that the first noodle strip 8 was disposed as an upper layer and the second noodle strip 16 was disposed as a lower layer. As a result, these first strip 8 and second strip 16 were rolled as they were passed through a space between the composite rolls 19a and 19b while being superposed to each other thereby forming a two-ply noodle strip 22 having a thickness of 8.0 mm. Then, the two-ply noodle strip 22 was further passed through a multi-roll comprising a sequence of plural pairs of rolls thereby reducing the thickness thereof to 1.2 mm, and then passed through a pair of cutter rolls each having a cutting edge of No. 20, thereby being cut down into a plurality of noodles and obtaining raw noodles of a two-ply structure.

The two-ply raw noodles were subsequently passed through a steamer into which steam was supplied at a pressure of 0.5 kg/cm$^2$ taking 2 minutes 40 seconds thereby being steamed. Then the two-ply raw noodles were dried in a steam-injecting type drying apparatus under the conditions of 85° C. to 90° C. in temperature and 170 g/m$^3$ in absolute humidity for 2 minutes with hot air thereby drying the two-ply raw noodles to such an extent that the water content of the two-ply raw noodles became 33%. The two-ply raw noodles were then partitioned into portions each corresponding to one meal, and immersed in a boiling water bath heated to 98° C. to be boiled for 25 seconds after putting the partitioned portions into a bucket. The two-ply raw noodles thus boiled were immersed together with the bucket in a water tank filled with water cooled to 20° C. thereby being cooled.

Subsequently, the two-ply raw noodles were treated with an aqueous solution of citric acid thereby adjusting the acidity thereof to 0.8 to 0.85. Subsequently, the two-ply raw noodles were allowed to stand for removing the attached water and then packed in a bag made of a heat-resistant resin film. Finally, the packed two-ply raw noodles were subjected to a heat treatment under the conditions of 90° C. in the core portion of the raw noodle for 15 minutes for sterilizing the two-ply raw noodles, and then cooled thereby obtaining packed wet-type instant noodles having a double-layered structure, pH of 4.1 and water content of 60%.

Comparative Example 1

A raw material consisting of the following composition was kneaded in a vacuum mixer at a vacuum of −700 mmHg for 15 minutes, and then the resultant dough was rolled in the conventional manner, thereby obtaining a noodle strip having a thickness of 1.2 mm.

| (The composition of the raw material) | |
|---|---|
| Semistrong flour | 3 kg |
| Medium flour | 5 kg |
| Tapioca starch | 2 kg |
| Table salt | 100 g |
| Kansui (aqueous solution of natural soda) | 10 g |
| Gardenia yellow dye | 6 g |
| Water | 3.7 kg |

Then, the noodles strip was cut down into a plurality of noodles and obtaining raw noodles of mono-layered structure.

The raw noodles were subsequently passed through a steamer into which steam was supplied at a pressure of 0.5 kg/cm$^2$ taking 2 minutes 40 seconds thereby being steamed. Then the raw noodles were immersed in a boiling water bath heated to 98° C. to be boiled for 25 seconds after putting the partitioned portions into a bucket. The raw noodles thus boiled were immersed together with the bucket in a water tank filled with water cooled to 20° C. thereby being cooled.

Subsequently, the raw noodles were treated with an aqueous solution of citric acid thereby adjusting the acidity thereof to 0.8 to 0.85. Subsequently, the raw noodles were allowed to stand for removing the attached water and then packed in a bag made of a heat-resistant resin film. Finally, the packed raw noodles were subjected to a heat treatment under the conditions of 90° C. or more in the core portion of the raw noodle for 15 minutes for sterilizing the noodles, and then cooled thereby obtaining packed wet-type instant noodles having a non-layered structure, pH of 4.1 and water content of 60%.

Comparative Example 2

The same processes as described in Example 1 were repeated except that the drying with hot air after the steaming step was not conducted, thereby obtaining packed wet-type instant noodles of a double-layered structure.

Comparative Example 3

The same processes as described in Example 1 were repeated except that the following compositions were employed as the first raw material and the second raw material, thereby obtaining packed wet-type instant noodles of a double-layered structure.

| (The composition of the first raw material) | |
|---|---|
| Medium flour | 5 kg |
| Table salt | 50 g |
| Kansui (aqueous solution of natural soda) | 10 g |
| Gardenia yellow dye | 3 g |
| Water | 1.85 kg |
| (The composition of the second raw material) | |
| Semistrong flour | 3 kg |
| Tapioca starch | 2 kg |
| Sodium alginate | 20 g |
| Table salt | 50 g |
| Kansui (aqueous solution of natural soda) | 10 g |
| Gardenia yellow dye | 3 g |
| Water | 1.85 kg |

Note:
The contents of protein in both of the medium four and Tapioca starch (raw powder) were 6.7% by weight.

Comparative Example 4

The same processes as described in Example 1 were repeated except that the first raw material and the second raw material, each having the same composition as that shown in Example 1 were kneaded in a vacuum mixer under the vacuum of −400 mmHg for 15 minutes, thereby obtaining packed wet-type instant noodles of a double-layered structure.

The packed wet-type instant noodles obtained in Example 1 and Comparative Examples 1 to 4 were put into an expanded polystyrene bowl together with packaged soup and various additives and then, after being capped, were subjected to shrink-packaged with a shrink film thereby obtaining final products.

These final products containing packed wet-type instant noodles obtained in Example 1 and Comparative Examples 1 to 4 were preserved at the ordinary temperature for 10 days before opening the package, taking the packed wet-type instant noodles out of the bowl, and taking the wet-type instant noodles out of the bag. Each of the wet-type instant noodles thus taken out were put into the bowl together with the soup, and hot water was poured into the bowl. Then, sensory test on the noodles which were left to stand for one minute was conducted by using panellers consisting of ten persons thereby to evaluate the smoothness, firmness and elasticity of the wet-type instant noodles. Likewise, in another test, the instant noodles thus taken out were put into the bowl together with the soup, and hot water was poured into the bowl. Then, sensory test on the noodles which were left to stand for 8 minute was conducted by using panellers consisting of ten persons thereby to evaluate the elongation of the noodles. The results are shown in the following Tables 1 to 3. The assessments on the smoothness, firmness, elasticity and elongation of the noodles were classified into 5 grades as indicated below.

(1) Smoothness

1: poor

2: somewhat poor

3: fair

4: good

5: very good (2) Firmness

1: poor

2: somewhat poor

3: fair

4: good

5: very good (3) Elasticity

1: poor

2: somewhat poor

3: fair

4: good

5: very good (4) Elongation

1: poor

2: somewhat poor

3: fair

4: good

5: very good

The sensory test on the elongation by 10 panellers was conducted by comparing the degree of elongation one minute after pouring hot water to the wet-type instant noodles with the degree of elongation 8 minute after pouring hot water to the wet-type instant noodles.

TABLE 1

| Peneller | Example 1 | | | | Comparative Example 1 | | | |
| --- | --- | --- | --- | --- | --- | --- | --- | --- |
| | Smoothness | Firmness | Elasticity | Elongation | Smoothness | Firmness | Elasticity | Elongation |
| A | 4 | 4 | 3 | 5 | 4 | 3 | 3 | 3 |
| B | 3 | 3 | 3 | 4 | 3 | 2 | 3 | 2 |
| C | 3 | 4 | 3 | 4 | 4 | 3 | 3 | 3 |
| D | 5 | 4 | 5 | 4 | 4 | 3 | 3 | 2 |
| E | 4 | 4 | 3 | 4 | 3 | 3 | 2 | 2 |
| F | 4 | 4 | 4 | 4 | 4 | 4 | 3 | 3 |
| G | 4 | 4 | 4 | 4 | 4 | 3 | 3 | 3 |
| H | 3 | 4 | 3 | 3 | 3 | 2 | 3 | 3 |
| I | 4 | 4 | 4 | 4 | 3 | 2 | 2 | 3 |
| J | 4 | 3 | 3 | 4 | 4 | 2 | 3 | 3 |
| Average | 3.8 | 3.7 | 3.5 | 3.9 | 3.6 | 2.7 | 2.8 | 2.8 |

TABLE 2

| Peneller | Example 1 | | | | Comparative Example 1 | | | |
| --- | --- | --- | --- | --- | --- | --- | --- | --- |
| | Smoothness | Firmness | Elasticity | Elongation | Smoothness | Firmness | Elasticity | Elongation |
| A | 3 | 3 | 3 | 3 | 4 | 3 | 3 | 3 |
| B | 3 | 2 | 3 | 3 | 3 | 2 | 2 | 2 |
| C | 3 | 3 | 3 | 3 | 4 | 3 | 2 | 2 |
| D | 4 | 3 | 3 | 2 | 4 | 3 | 3 | 2 |
| E | 4 | 3 | 2 | 2 | 3 | 2 | 2 | 3 |
| F | 3 | 4 | 3 | 3 | 4 | 3 | 3 | 3 |
| G | 4 | 3 | 3 | 3 | 4 | 4 | 3 | 3 |

TABLE 2-continued

| | Example 1 | | | | Comparative Example 1 | | | |
|---|---|---|---|---|---|---|---|---|
| Peneller | Smoothness | Firmness | Elasticity | Elongation | Smoothness | Firmness | Elasticity | Elongation |
| H | 3 | 2 | 3 | 3 | 3 | 3 | 3 | 2 |
| I | 4 | 2 | 2 | 3 | 3 | 3 | 3 | 3 |
| J | 4 | 2 | 3 | 3 | 4 | 3 | 3 | 3 |
| Average | 3.5 | 2.7 | 2.8 | 2.8 | 3.6 | 2.9 | 2.7 | 2.6 |

TABLE 3

| | Comparative Example 4 | | | |
|---|---|---|---|---|
| Peneller | Smoothness | Firmness | Elasticity | Elongation |
| A | 4 | 3 | 3 | 4 |
| B | 3 | 3 | 3 | 3 |
| C | 3 | 3 | 3 | 4 |
| D | 4 | 4 | 4 | 4 |
| E | 3 | 3 | 2 | 3 |
| F | 4 | 3 | 3 | 3 |
| G | 4 | 4 | 4 | 4 |
| H | 3 | 3 | 3 | 3 |
| I | 3 | 3 | 3 | 3 |
| J | 4 | 3 | 3 | 3 |
| Average | 3.5 | 3.2 | 3.1 | 3.5 |

As clear from these Tables 1 to 3, the wet-type instant noodles obtained in Example 1 are far superior as compared to the wet-type instant noodles in smoothness, firmness and elasticity, and at the same time the elongation upon boiling thereof is not so large, thereby giving excellent eating feeling and taste.

EXAMPLE 2

An apparatus shown in the Figure was employed. Namely, a first raw material consisting of the following composition was kneaded in the first mixer 2 shown in the Figure at a vacuum of −400 mmHg for 15 minutes, and then the resultant dough 3 was fed via a first feeder 5 and a first hopper 6 between a pair of the rolls 7a and 7b to be rolled by the pair of the rolls 7a and 7b thereby obtaining a first noodle strip 8 having a thickness of 5.5 mm.

| (The composition of the first raw material) | |
|---|---|
| Semistrong flour | 3 kg |
| Tapioca starch | 2 kg |
| Table salt | 50 g |
| Kansui (aqueous solution of natural soda) | 10 g |
| Gardenia yellow dye | 3 g |
| Water | 1.85 kg |

An apparatus shown in the Figure was employed. Namely, a second raw material consisting of the following composition was kneaded in the second mixer 10 at a vacuum of −700 mmHg for 15 minutes, and then the resultant dough 11 was fed via a second feeder 13 and a second hopper 14 between a pair of rolls 15a and 15b to be rolled by the pair of the rolls 15a and 15b thereby obtaining a second noodle strip 16 having a thickness of 5.5 mm.

| (The composition of the second raw material) | |
|---|---|
| Medium flour (containing crude protein of 8% by weight) | 5 kg |
| Trans-glutaminase | 1500 units |
| Casein decomposition material (Peptide C-700, Morinaga Nyugyo Co. Ltd.) | 10 g |
| Sodium alginate | 20 g |
| Table salt | 50 g |
| Kansui (aqueous solution of natural soda) | 10 g |
| Gardenia yellow dye | 3 g |
| Water | 1.85 kg |

(Note: The ratio of trans-glutaminase is 30 units per 100 g of medium flour, and the ratio of casein is 0.7 g per 100 units of trans-glutaminase.)

Subsequently, as shown in the Figure, the first noodle strip 8 was then fed to a space between a pair of composite rolls 19a and 19b while being guided by a guide bar 17 and a guide roll 18, and at the same time the second noodle strip 16 was fed to a space between a pair of composite rolls 19a and 19b while being guided by an endless belt 20 and a guide bar 21. Namely, the first noodle strip 8 and the second noodle strip 16 were fed between a pair of composite rolls 19a and 19b in such a manner that the first noodle strip 8 was disposed as an upper layer and the second noodle strip 16 was disposed as a lower layer. As a result, these first strip 8 and second strip 16 were rolled as they were passed through a space between the composite rolls 19a and 19b while being superposed to each other thereby forming a two-ply noodle strip 22 having a thickness of 8 mm. Then, the two-ply noodle strip 22 was further passed through a multi-roll comprising a sequence of plural pairs of rolls thereby reducing the thickness thereof to 1.2 mm, and then passed through a pair of cutter rolls each having a cutting edge of No. 20, thereby being cut down into a plurality of noodles and obtaining raw noodles of two-ply structure.

The two-ply raw noodles were subsequently passed through a steamer into which steam was supplied at a pressure of 0.5 kg/cm$^2$ taking 2 minutes 40 seconds thereby being steamed. Then, the raw noodles were partitioned into portions each corresponding to one meal, and immersed in a boiling water bath heated to 98° C. to be boiled for 25 seconds after putting the partitioned portions into a bucket. The two-ply raw noodles thus boiled were immersed together with the bucket in a water tank filled with water cooled to 20° C. thereby being cooled.

Subsequently, the two-ply raw noodles were treated with an aqueous solution of citric acid thereby adjusting the acidity thereof to 0.8 to 0.85. Subsequently, the two-ply raw noodles were allowed to stand for removing the attached water and then packed in a bag made of a heat-resistant resin film. Finally, the packed two-ply raw noodles were subjected to a heat treatment under the conditions of 90° C. or more in the core portion of the raw noodle for 15 minutes for sterilizing the two-ply raw noodles, and then cooled thereby obtaining packed wet-type instant noodles having a double-layered structure, pH of 4.1 and water content of 60%.

EXAMPLE 3

The same processes as described in Example 2 were repeated except that the two-ply raw noodles were dried after the steaming step in a steam-injecting type drying apparatus under the conditions of 85° C. to 90° C. in temperature and 170 g/m$^3$ in absolute humidity for 2 minutes with hot air thereby drying the two-ply raw noodles to such an extent that the water content of the two-ply raw noodles became 33%, thereby obtaining packed wet-type instant noodles of a double-layered structure.

The packed wet-type instant needles obtained in Examples 2 and 3 were put into an expanded polystyrene bowl together with packaged soup and various additives and then, after being capped, were subjected to shrink-packaged with a shrink film thereby obtaining final products.

These final products containing the packed wet-type instant needles obtained in Examples 2 and 3 were preserved at the ordinary temperature for 10 days before opening the package, taking the packed wet-type instant noodles out of the bowl, and taking the wet-type instant noodles out of the bag. Each of the wet-type instant noodles thus taken out were put into the bowl together with the soup, and hot water was poured into the bowl. Then, sensory test on the wet-type instant noodles which were left to stand for one minute was conducted by using panellers consisting of ten persons thereby to evaluate the smoothness, firmness and elasticity of the noodles. The assessment was performed in five grades as in the case of Example 1. Likewise, in another test, the wet-type instant noodles thus taken out were put into the bowl together with the soup, and hot water was poured into the bowl. Then, sensory test on the noodles which were left to stand for 8 minute was conducted by using panellers consisting of ten persons thereby to evaluate the elongation of the noodles. The assessment was performed in five grades as in the case of Example 1.

TABLE 4

| Peneller | Example 1 | | | | Comparative Example 1 | | | |
| --- | --- | --- | --- | --- | --- | --- | --- | --- |
| | Smoothness | Firmness | Elasticity | Elongation | Smoothness | Firmness | Elasticity | Elongation |
| A | 4 | 3 | 4 | 5 | 4 | 4 | 4 | 5 |
| B | 3 | 3 | 4 | 4 | 3 | 3 | 4 | 4 |
| C | 3 | 4 | 3 | 4 | 3 | 4 | 3 | 4 |
| D | 4 | 4 | 5 | 4 | 5 | 4 | 5 | 4 |
| E | 3 | 3 | 4 | 3 | 4 | 3 | 4 | 4 |
| F | 4 | 4 | 5 | 4 | 4 | 4 | 5 | 4 |
| G | 4 | 4 | 4 | 4 | 4 | 4 | 4 | 4 |
| H | 3 | 4 | 3 | 3 | 3 | 4 | 3 | 3 |
| I | 4 | 3 | 4 | 4 | 4 | 4 | 4 | 4 |
| J | 4 | 3 | 4 | 4 | 4 | 3 | 4 | 4 |
| Average | 3.6 | 3.5 | 4.0 | 3.9 | 3.8 | 3.7 | 4.0 | 3.9 |

As seen from Table 4, the wet-type instant noodles obtained in Examples 2 and 3, which contain trans-glutaminase and casein-decomposition material are more superior as compared with the wet-type instant noodles obtained in Example 1 with respect to elasticity (Koshi). Further, when the wet-type instant noodles obtained in Example 2 are compared with the wet-type instant noodles obtained in Example 3, it is clear that the wet-type instant noodles obtained in Example 3 is more superior in smoothness than the wet-type instant noodles obtained in Example 2. This can be attributed to the step of drying with hot air which has been performed in Example 3.

According to the present invention, it has become possible to provide a method for manufacturing packed wet-type instant noodles, which are of a double-layered structure so that simple in structure as compared with a three-ply structure, and excellent in smoothness, tenacity and softness, and have improved elasticity and firmness.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for manufacturing packed wet instant noodles, which comprises the steps of;

forming a first noodle strip from a dough obtained by kneading in a vacuum a first raw material containing an alkaline agent and raw powders consisting mainly of wheat flour and starch;

forming a second noodle strip from a dough obtained by kneading a second raw,material in a vacuum higher in degree than that employed in kneading said first raw material, said second raw material containing alginic acid or alginate, an alkaline agent and raw powders consisting mainly of wheat flour and 7.0% by weight or more of protein;

forming a two-ply noodle strip by superposing said first noodle strip upon said second noodle strip, and by rolling the superposed strips;

cutting said two-ply noodle strip into a plurality of noodles thereby obtaining two-ply raw noodles;

steaming the two-ply raw noodles;

drying the two-ply raw noodles with a hot air;

boiling and then cooling with water the dried two-ply raw noodles;

treating the cooled two-ply raw noodles with an acid solution;

packing the two-ply raw noodles in a bag; and heat treating the packed two-ply raw noodles thereby thermally sterilizing the two-ply raw noodles.

2. The method according to claim 1, wherein the raw powders used as said second raw material contain 8 to 12% by weight of protein.

3. The method according to claim 1, wherein said second raw material contains 0.2 to 0.6% by weight of alginic acid or alginate.

4. The method according to claim 1, wherein said first raw material is kneaded in a vacuum of −450 to −350 mmHg, and said second raw material is kneaded in a vacuum of −760 to −650 mmHg.

5. The method according to claim 1, wherein said two-ply noodle strip is prepared by superposing said first noodle strip upon said second noodle strip and then rolling the superposed strips.

6. The method according to claim 1, wherein said drying step is conducted by passing said two-ply raw noodles through a steam-injecting drying apparatus under the conditions of 70° C. to 100° C. in temperature and 140 to 180 g/m$^3$ in absolute humidity.

7. The method according to claim 1, wherein said drying step is conducted by passing said two-ply raw noodles through a steam-injecting drying apparatus filled with steam under the conditions of 70° C. to 100° C. in temperature.

8. The method according to claim 1, wherein said boiling step is performed to such an extent that the water content in the raw noodles is in the range of 57 to 62%.

9. The method according to claim 1, wherein said acid treatment step is performed by using an aqueous solution containing an organic acid selected from the group consisting of citric acid and lactic acid in such an extent that pH of the raw noodles becomes in the range of 4.0 to 5.0.

10. The method according to claim 1, wherein the heat treatment step is performed at a temperature of 90° to 110° C.

11. A method for manufacturing packed wet instant noodles, which comprises the steps of;

forming a first noodle strip from a dough obtained by kneading in a vacuum a first raw material containing an alkaline agent and raw powders consisting mainly of wheat flour and starch;

forming a second noodle strip from a dough obtained by kneading a second raw material in a vacuum higher in degree than that employed in kneading said first raw material, said second raw material containing alginic acid or alginate, trans-glutaminase, casein-decomposition material, an alkaline agent, and raw powders consisting mainly of wheat flour and 7.0% by weight or more of protein;

forming a two-ply noodle strip by superposing said first and second noodle strips upon one another, and then rolling the superposed strips;

cutting said two-ply noodle strip into a plurality of noodles thereby obtaining two-ply raw noodles;

steaming the two-ply raw noodles;

boiling and then water-cooling the steamed two-ply raw noodles;

treating the cooled two-ply raw noodles with an acid solution;

packing the two-ply raw noodles in a bag; and heat treating the packed two-ply raw noodles thereby thermally sterilizing the two-ply raw noodles.

12. The method according to claim 11, wherein the raw powders used as said second raw material contain 8 to 12% by weight of protein.

13. The method according to claim 11, wherein said second raw material contains 0.2 to 0.6% by weight of alginic acid or alginate.

14. The method according to claim 11, wherein said second raw material contains 10 to 200 units of trans-glutaminase per 100 g of said raw powders.

15. The method according to claim 11, wherein said second raw material contains 20 to 150 units of trans-glutaminase per 100 g of said raw powders.

16. The method according to claim 11, wherein said second raw material contains 0.3 to 2.0 g of casein-decomposition material per 100 units of trans-glutaminase.

17. The method according to claim 11, wherein said second raw material contains 0.5 to 1.5 g of casein-decomposition material per 100 units of trans-glutaminase.

18. The method according to claim 11, wherein said first raw material is kneaded in a vacuum of −450 to −350 mmHg, and said second raw material is kneaded in a vacuum of −760 to −650 mmHg.

19. The method according to claim 11, wherein said two-ply noodle strip is prepared by superposing said first noodle strip upon said second noodle strip and then rolling the superposed strips.

20. The method according to claim 11, wherein said boiling step is performed in such an extent that the water content in the raw noodles is in the range of 57 to 62%.

21. The method according to claim 11, wherein said acid treatment step is performed by using an aqueous solution containing an organic acid selected from the group consisting of citric acid and lactic acid in such an extent that pH of the raw noodles becomes in the range of 4.0 to 5.0.

22. The method according to claim 11, wherein the heat treatment step is performed at a temperature of 90° to 110° C.

23. The method according to claim 11, wherein drying step is conducted in subsequent to the steaming step and in advance to the boiling step.

24. The method according to claim 23, wherein said drying step is conducted by passing said two-ply raw noodles through a steam-injecting drying apparatus under the conditions of 70° C. to 100° C. in temperature and 140 to 180 g/m$^3$ in absolute humidity.

25. The method according to claim 23, wherein said drying step is conducted by passing said two-ply raw noodles through a steam-injecting drying apparatus filled with steam under the conditions of 70° C. to 100° C. in temperature.

* * * * *